(12) United States Patent
Kanamori et al.

(10) Patent No.: US 10,028,051 B2
(45) Date of Patent: Jul. 17, 2018

(54) SOUND SOURCE LOCALIZATION APPARATUS

(71) Applicant: Panasonic Intellectual Property Management Co., Ltd., Osaka (JP)

(72) Inventors: Takeo Kanamori, Osaka (JP); Shinichi Yuzuriha, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/227,341

(22) Filed: Aug. 3, 2016

(65) Prior Publication Data

US 2017/0064441 A1    Mar. 2, 2017

Related U.S. Application Data

(60) Provisional application No. 62/211,949, filed on Aug. 31, 2015.

(30) Foreign Application Priority Data

Dec. 17, 2015    (JP) ................................ 2015-246804

(51) Int. Cl.
    *H04R 1/40*            (2006.01)
    *H04R 1/08*            (2006.01)
    (Continued)

(52) U.S. Cl.
    CPC ............... *H04R 1/406* (2013.01); *H04R 1/08* (2013.01); *G01S 3/8006* (2013.01);
    (Continued)

(58) Field of Classification Search
    CPC ....................................................... H04R 1/406
    (Continued)

(56) References Cited

U.S. PATENT DOCUMENTS

| 4,536,887 A | 8/1985 | Kaneda et al. |
| 2011/0164760 A1 | 7/2011 | Horibe et al. |

(Continued)

FOREIGN PATENT DOCUMENTS

| JP | 2008-048294 | 2/2008 |
| JP | 2011-124749 | 6/2011 |

OTHER PUBLICATIONS

The Extended European Search Report dated Jan. 17, 2017 for the related European Patent Application No. 16186561.3.

(Continued)

*Primary Examiner* — Md S Elahee
(74) *Attorney, Agent, or Firm* — Greenblum & Bernstein, P.L.C.

(57) ABSTRACT

A sound source localization apparatus is provided which can more surely detect a sound source located in a detection target region. The sound source localization apparatus includes a plurality of microphones and a baffle. The baffle has a first surface and a second surface. The second surface is a surface opposite to the first surface. The plurality of microphones are two-dimensionally arrayed and fixed in the first surface. The baffle allows the plurality of microphones to pick up direct sound arriving at the first surface and prevents the plurality of microphones from picking up direct sound arriving at the second surface.

8 Claims, 12 Drawing Sheets

(51) Int. Cl.
*G01S 3/80* (2006.01)
*G01S 3/808* (2006.01)
*H04R 3/00* (2006.01)

(52) U.S. Cl.
CPC ............ *G01S 3/8083* (2013.01); *H04R 3/005* (2013.01); *H04R 2201/401* (2013.01); *H04R 2430/20* (2013.01); *H04R 2430/21* (2013.01)

(58) Field of Classification Search
USPC .............................. 381/92, 356, 58; 704/246
See application file for complete search history.

(56) References Cited

U.S. PATENT DOCUMENTS

2014/0088966 A1* 3/2014 Harada .................. G10L 25/78
704/246
2015/0304765 A1* 10/2015 Nielsen .................. H04R 3/005
381/92
2017/0245065 A1* 8/2017 Suhami ................ H04R 25/505

OTHER PUBLICATIONS

J. Hurault et al: "Aeroacoustic wind tunnel experiment for serration design optimisation and its application to a wind turbine rotor", 6th International Meeting onWind Turbine Noise, Glasgow Apr. 20-23, 2015, Apr. 22, 2015 (Apr. 22, 2015), XP055332152, Retrieved from the Internet: URL:https://www.researchgate.net/profile/Jeremy_Hurault/publication/277028583_Aeroacoustic_wind_tunnel_experiment_for_serration_design_optimisation_and_its_application_to_a_wind_turbine_rotor/links/5560297208ae6f4dcc9276ba.pdf [retrieved on Jan. 4, 2017].

* cited by examiner

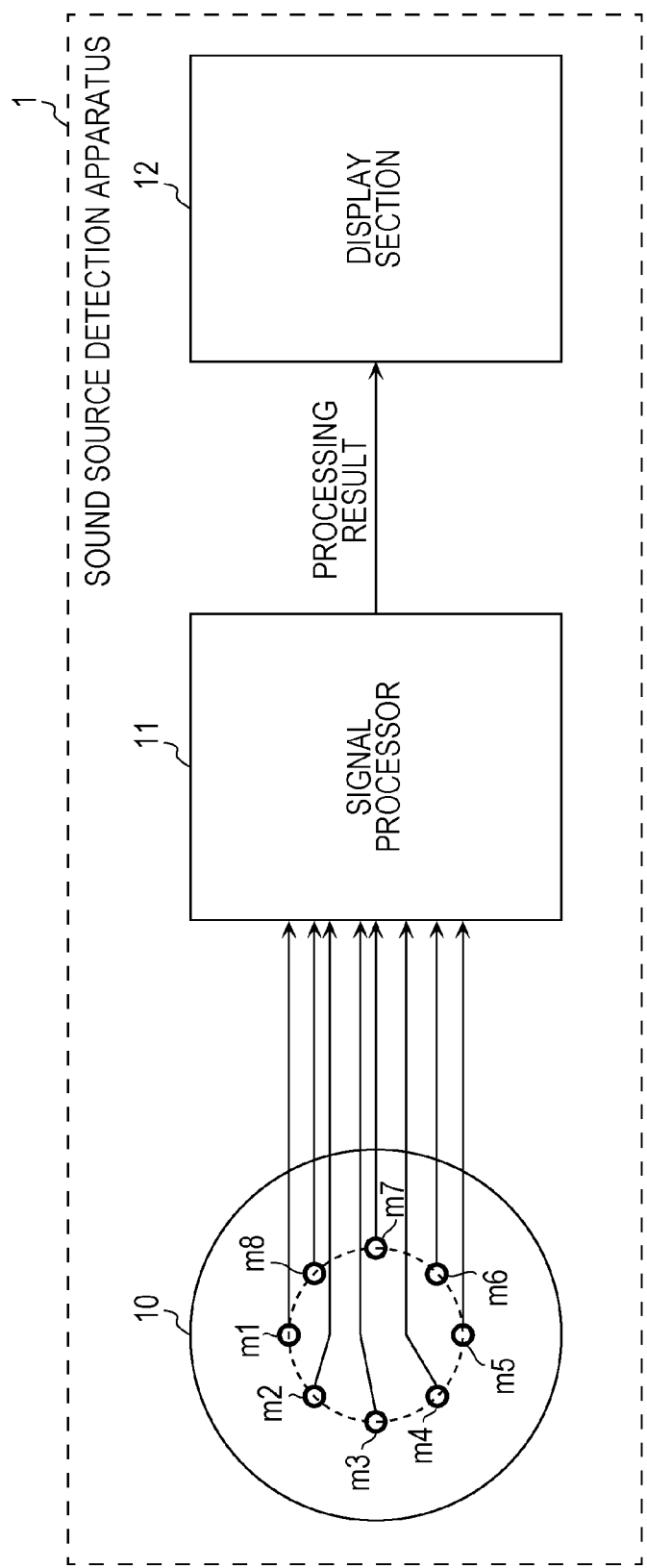

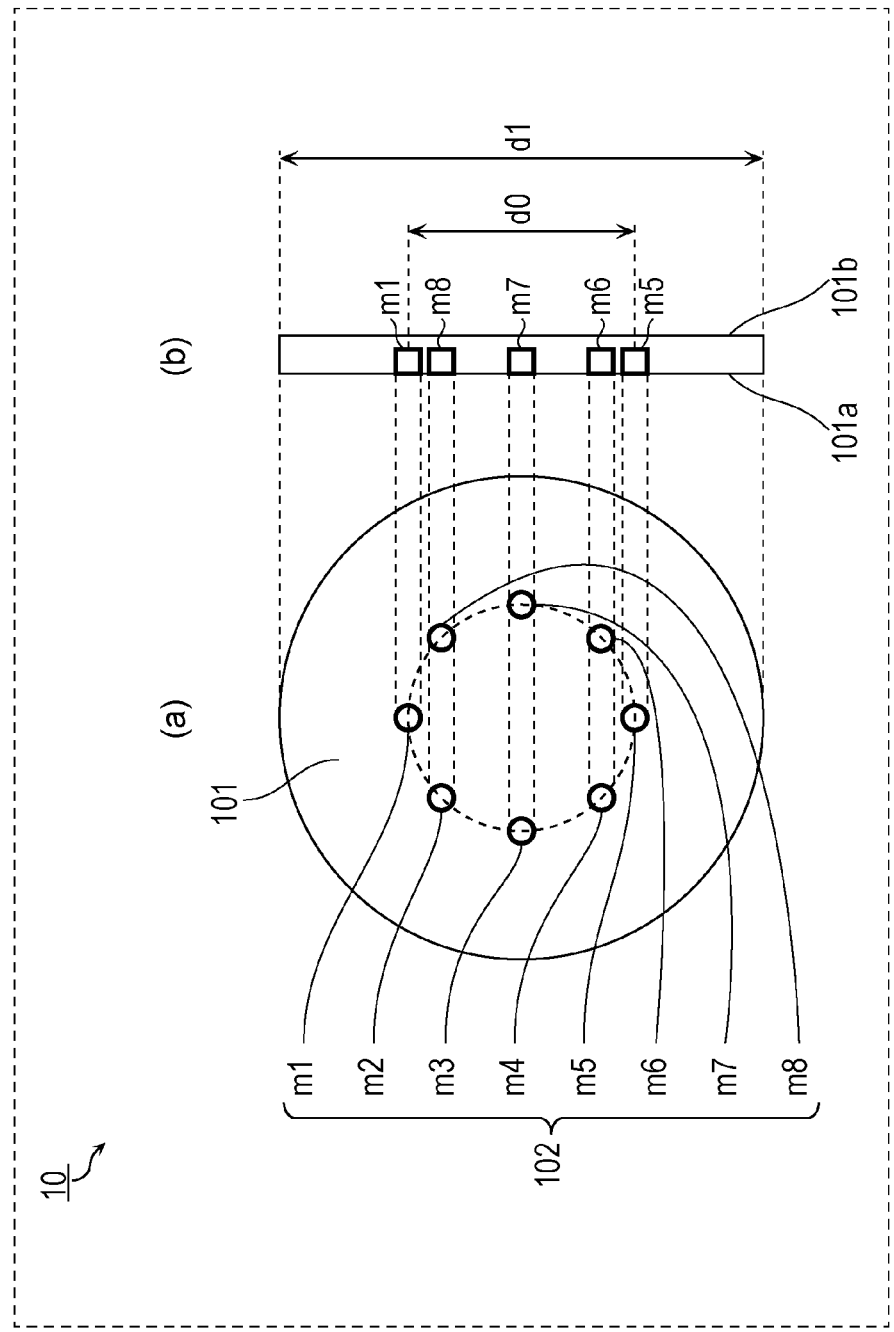

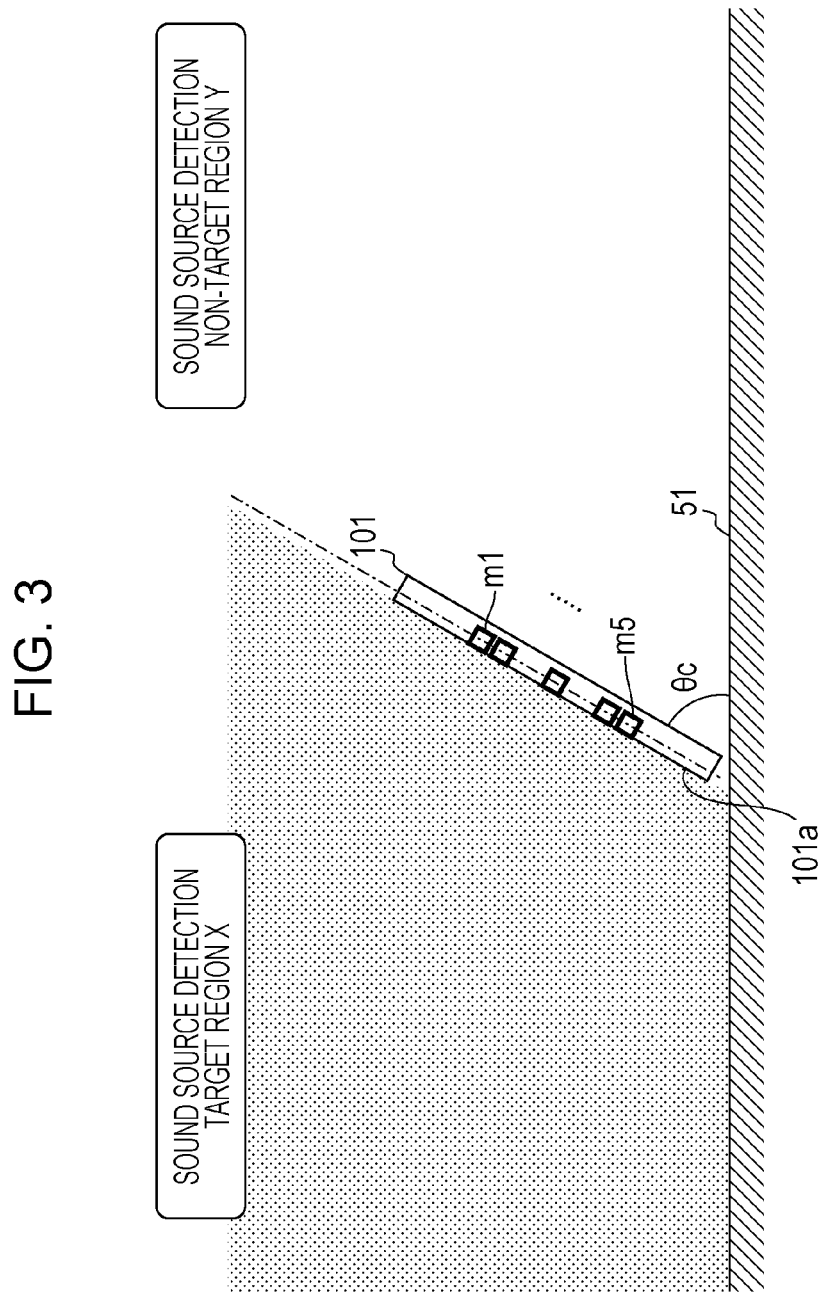

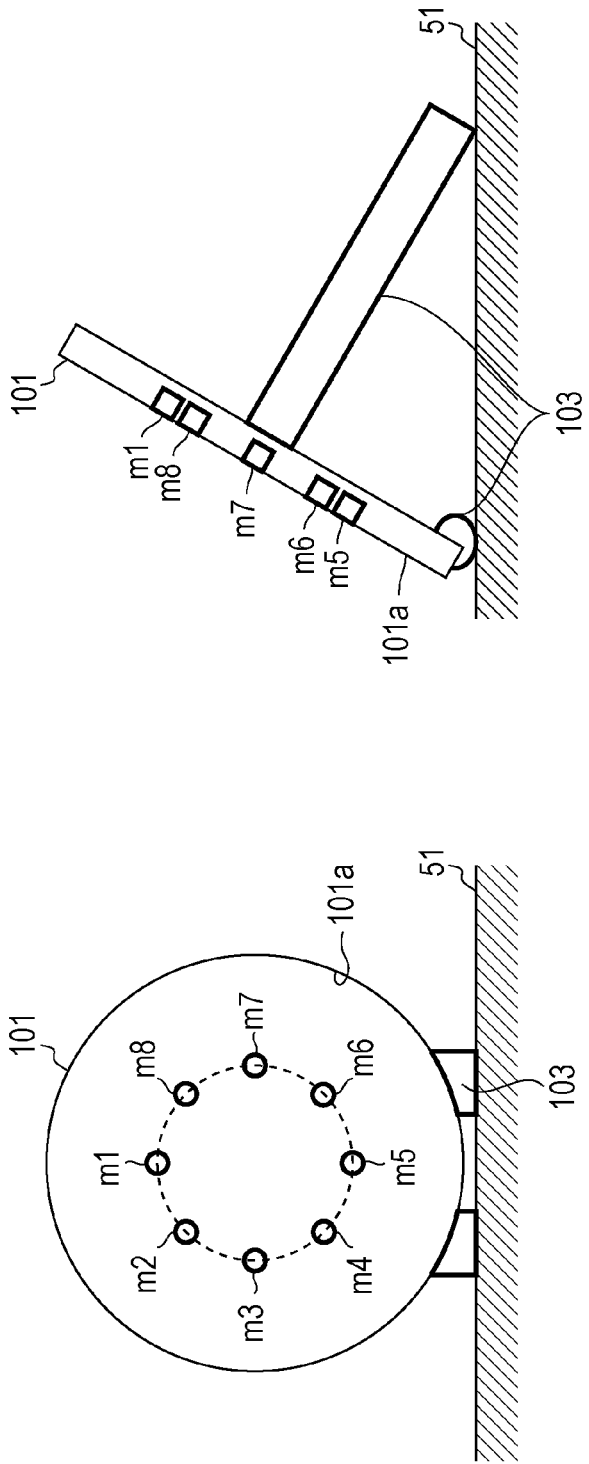

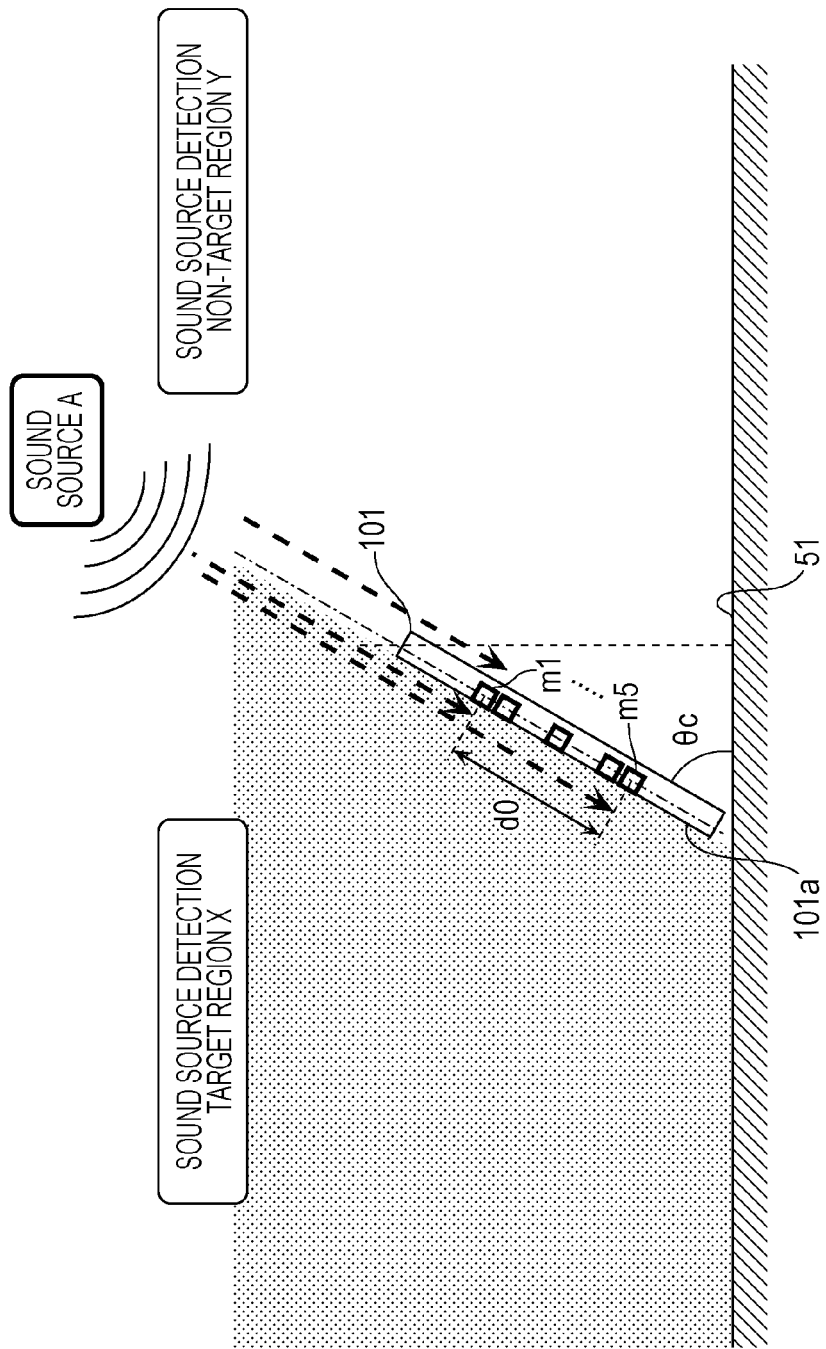

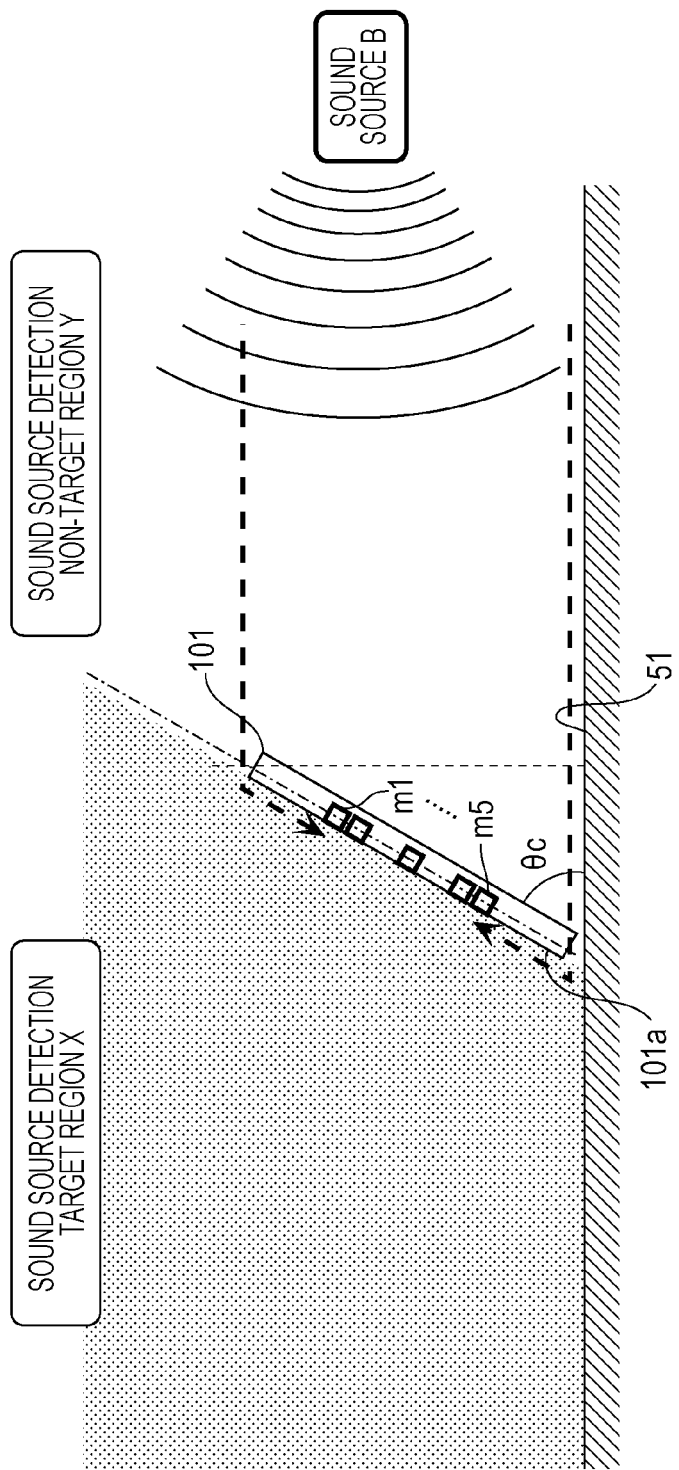

SOUND SOURCE LOCALIZATION APPARATUS

BACKGROUND

1. Technical Field

The present disclosure relates to a sound source localization apparatus.

2. Description of the Related Art

There has been proposed a sound source localization apparatus that performs sound source localization on the basis of the phase differences between sounds (sound waves) that are generated when the sounds arrive at a microphone array of microphones arrayed in the same plane (for example, see Japanese Unexamined Patent Application Publication No. 2011-124749).

Such a sound source localization apparatus as that disclosed in Japanese Unexamined Patent Application Publication No. 2011-124749 has the advantages of being simple in structure and high in installability.

However, such a conventional sound source localization apparatus as that disclosed in Japanese Unexamined Patent Application Publication No. 2011-124749 is undesirably unable to distinguish between sound sources (a sound source at the front surface side and a sound source at the back surface side) that have symmetry with respect to the array plane of the microphone array, as the phase difference between sound waves from one of the sound sources is equal to the phase difference between sound waves from the other sound source. That is, under the influence of the sound source at the back surface side, which is not a detection target region, of the sound source localization apparatus, the conventional sound source localization apparatus may be unable to detect the sound source located in a space at the front surface side, which is a detection target region, of the sound source localization apparatus.

SUMMARY

The present disclosure, made in view of the aforementioned circumstances, has as an object to provide a sound source localization apparatus that can more surely detect a sound source located in a detection target region.

In one general aspect, the techniques disclosed here feature a sound source localization apparatus including: a plurality of microphones; a buffle (i.e., a baffle) having a first surface and a second surface, the second surface being a surface opposite to the first surface, the plurality of microphones being two-dimensionally arrayed and fixed in the first surface, wherein the buffle allows the plurality of microphones to pick up direct sound from a sound source located at a side of the first surface and prevents the plurality of microphones from picking up direct sound from a sound source located at a side of the second surface.

It should be noted that some of these specific aspects may be implemented as a system, a method, an integrated circuit, a computer program, a computer-readable storage medium such as a CD-ROM, or any selective combination thereof.

The present disclosure makes it possible to achieve a sound source localization apparatus that can more surely detect a sound source located in a detection target region.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a diagram showing an example of a configuration of a sound source localization apparatus according to an embodiment;

FIG. 2 is a conceptual diagram showing an example of a sound pickup device according to the embodiment;

FIG. 3 is a diagram showing an example of installation of the sound pickup device according to the embodiment and a sound detection target region;

FIG. 4A is a diagram showing an example of installation of the sound pickup device according to the embodiment;

FIG. 4B is a side view of the sound pickup device shown in FIG. 4A;

FIG. 6 is a diagram for explaining a relationship between a sound source that maximizes the phase difference between sound waves arriving at the sound pickup device shown in FIG. 3 and the arrangement of a plurality of microphone elements;

FIG. 7 is a diagram for explaining a relationship between a sound source that minimizes the phase difference between sound waves arriving at the sound pickup device shown in FIG. 3 and the size of a buffle section;

Figure 5A:
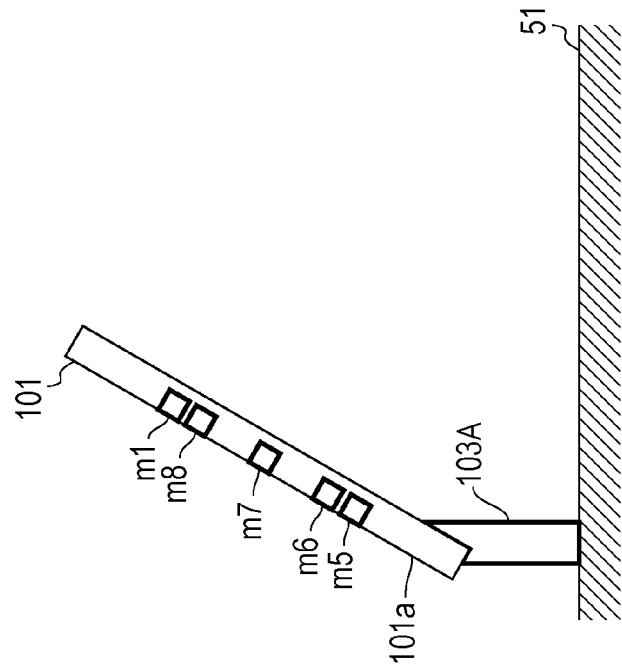
FIG. 5A is a diagram showing another example of installation of the sound pickup device according to the embodiment.

DETAILED DESCRIPTION (Underlying Knowledge Forming Basis of the Present Disclosure)

As mentioned above, a conventional sound source localization apparatus such as that disclosed in Japanese Unexamined Patent Application Publication No. 2011-124749 is undesirably unable to distinguish between sound sources (a sound source at the front surface side and a sound source at the back surface side) that have symmetry with respect to the array plane of the microphone array, as the phase difference (difference in time of arrival) between sound waves from one of the sound sources is equal to the phase difference between sound waves from the other sound source. In other words, under the influence of the sound source at the back surface side of the sound source localization apparatus, which is not a detection target region, the conventional sound source localization apparatus may undesirably be unable to detect the sound source located in a space at the front surface side of the sound source localization apparatus, which is a detection target region.

A possible way of solving this problem is to three-dimensionally arrange a plurality of microphone elements (microphones) constituting a microphone array.

However, three-dimensionally arranging a plurality of microphone elements raises new problems, i.e., makes the sound source localization apparatus less simple in structure and lower in installability. Specifically, for example, in three-dimensionally arranging a plurality of microphone elements, it is necessary to meet requirements such as acoustically satisfying the structure of a microphone array so that sound waves from all directions may arrive at the respective microphone elements without disturbing the phase differences and keeping the strength of the microphone array. However, a microphone array that meets these requirements requires cumbersome and complicated operation to be installed, and as such, it is low in installability.

The present disclosure, made in view of the aforementioned circumstances, has as an object to provide a sound source localization apparatus that, by suppressing the influence of sound waves coming from the back surface side of a microphone array including a plurality of microphone elements, can more surely detect a sound source located in a detection target region.

A sound source localization apparatus according to one aspect of the present disclosure includes: a plurality of microphones; a buffle having a first surface and a second surface, the second surface being a surface opposite to the first surface, the plurality of microphones being two-dimensionally arrayed and fixed in the first surface, wherein the buffle allows the plurality of microphones to pick up direct sound from a sound source located at a side of the first surface and prevents the plurality of microphones from picking up direct sound from a sound source located at a side of the second surface.

That is, including the buffle makes it possible to effect diffraction of sound waves generated by the sound source located at the side of the second surface, thus making it possible to make the phase difference between sound waves arriving at the plurality of microphone elements larger at the side of the second surface than at the side of the first surface. This makes it possible to suppress the influence of sound waves coming from the second surface (back surface side), thus making it possible to more surely detect a sound source at the first surface (front surface side), i.e., a sound source located in the detection target region.

Note here that, for example, the plurality of microphones are arrayed in a part of the buffle that is closer to the center of the buffle than the outer edge of the buffle by a predetermined or greater length.

This makes it possible to more surely make the phase difference between sound waves arriving at the plurality of microphone elements larger at the side of the second surface than at the side of the first surface.

Further, for example, the sound source localization apparatus may further include a supporting member that supports the buffle such that the first surface of the buffle forms a predetermined angle with an installation surface on which the sound source localization apparatus is installed.

This makes it possible to more surely make the phase difference between sound waves arriving at the plurality of microphone elements larger at the side of the second surface than at the side of the first surface.

Further, for example, the buffle may be a circular plate member, and the diameter of the buffle may be calculated on the basis of the maximum length of intervals between the plurality of microphones and the predetermined angle.

Note here that, for example, the relationship $(d_0/\cos(\theta_c)) < d_1$ is satisfied, where $d_1$ is the diameter of the buffle, $d_0$ is the maximum length, and $\theta_c$ is the predetermined angle.

Further, for example, the buffle may be a rectangular plate member, and the length of a side of the buffle may be calculated on the basis of the maximum length of intervals between the plurality of microphones and the predetermined angle.

Note here that, for example, the relationship $(d_0/\cos(\theta_c)) < d_1$ is satisfied, where $d_1$ is the length of a side of the buffle, $d_0$ is the maximum length, and $\theta_c$ is the predetermined angle.

Further, for example, the plurality of microphones may be buried in the buffle such that sound holes of the plurality of microphones are exposed at the first surface but are not exposed at the second surface.

It should be noted that some of these specific aspects may be implemented as a system, a method, an integrated circuit, a computer program, a computer-readable storage medium such as a CD-ROM, or any selective combination thereof.

A sound source localization apparatus according to one aspect of the present disclosure is specifically described below with reference to the drawings. It should be noted that an embodiment described below is a specific example of the present disclosure. Numerical values, shapes, materials, constituent elements, and the arrangement and locations of the constituent elements, and the like that are shown in the embodiment below are examples, and are not intended to limit the present disclosure. Those of the constituent elements in the embodiment below which are not recited in an independent claim representing the most superordinate concept are described as optional constituent elements. Further, the content of each embodiment may be combined with that of the other.

It should be noted that the embodiment described below assumes a distance relationship in which the distance to a sound source that the sound source localization apparatus detects is a sufficiently long distance with respect to the size of the microphone array and a sound wave arriving at the microphone array from the sound source can be deemed as a plane wave. More specifically, the embodiment described below assumes a distance that is approximately three to five or more times as great as the size of the microphone array.

(Embodiment)

[Overall Configuration of Sound Source Localization Apparatus 1]

FIG. 1 is a diagram showing an example of a configuration of a sound source localization apparatus 1 according to an embodiment.

The sound source localization apparatus 1 identifies the location or the like of a sound source by detecting the sound source on the basis of the intensity of sound waves picked up and the phase difference between them. In the present embodiment, as shown in FIG. 1, the sound source localization apparatus 1 includes a sound pickup device 10, a signal processor 11, and a display section 12. The following describes each of the constituent elements in detail.

[Sound Pickup Device 10]

FIG. 2 is a conceptual diagram showing an example of the sound pickup device 10 according to the present embodiment. (a) of FIG. 2 is a front view of the sound pickup device 10, and (b) of FIG. 2 is a side view of the sound pickup device 10. FIG. 3 is a diagram showing an example of installation of the sound pickup device 10 according to the embodiment and a sound detection target region.

As shown in (a) of FIG. 2, the sound pickup device 10 includes a buffle section 101 and a microphone array 102.

The microphone array 102 includes a plurality of nondirectional microphone elements having high sensitivity to sound pressures. The plurality of microphone elements are arrayed in a part of the buffle section 101 that is closer to the center of the buffle section 101 than the outer edge of the buffle section 101 by a predetermined or greater length. Note here that the plurality of microphone elements are for example sound sensors. Further, the plurality of microphone elements may be capacitor microphone chips manufactured using a semiconductor manufacturing technology. Each of the microphone chips has a diaphragm that is displaced by a sound pressure and has a function of converting a sound signal into an electrical signal. Note here that the plurality of microphone elements may be buried in the buffle section 101 such that sound holes of the plurality of microphone elements are exposed at a first surface of the buffle section 101 but are not exposed at a second surface of the buffle section 101. In the present embodiment, as shown in FIG. 2, the microphone array 102 includes microphone elements m1 to m8 (eight microphone elements) arrayed in a ring shape (annular shape). Further, the microphone elements m1 to m8 are buried in the buffle section 101 such that sound holes of the microphone elements m1 to m8 are exposed at a first surface (front surface 101a) of the buffle section 101 but are not exposed at a second surface (back surface 101b) of the buffle section 101.

It should be noted that although the following gives a description by taking, as an example, a case where the microphone array 102 includes the eight microphone elements m1 to m8, this case does not imply any limitation. The microphone array 102 needs only include at least three microphone elements, but a larger number of microphone elements make it possible to pick up sound with a higher degree of accuracy.

The buffle section 101 has the first surface and the second surface, which is a surface opposite to the first surface, with the plurality of microphone elements (microphone elements m1 to m8) two-dimensionally arrayed on the first surface. Moreover, the buffle section 101 allows the plurality of microphone elements to pick up direct sound from a sound source located at the side of the first surface and prevents the plurality of microphone elements from picking up direct sound from a sound source located at the side of the second surface. This is because the buffle section 101 can effect diffraction of sound waves generated by the sound source located at the side of the second surface and can therefore make the phase difference between sound waves arriving at the plurality of microphone elements larger at the side of the second surface than at the side of the first surface. Further, the buffle section 101 can bring about a buffle effect to heighten the sensitivity of the microphone array 102 by approximately 6 db.

Further, the buffle section 101 may be disposed such that the first surface forms a predetermined angle $\theta_c$ with an installation surface on which the sound source localization apparatus 1 is installed. This is because disposing the buffle section 101 such that the first surface forms the predetermined angle $\theta_c$ with the installation surface can make the phase difference between sound waves from the sound source at the side of the first surface smaller than the phase difference between sound waves from the sound source at the side of the second surface.

Assuming here that the buffle section 101 is constituted, for example, by a circular plate member, the diameter $d_1$ of the buffle section 101 can be calculated on the basis of the maximum length $d_0$ of intervals between the plurality of microphone elements and the predetermined angle $\theta_c$. The method for calculating the diameter $d_1$ will be described in detail later, and as such, it is not described here.

In the present embodiment, the first surface corresponds to the front surface 101a shown in (b) of FIG. 2, and the second surface corresponds to the back surface 101b shown in (b) of FIG. 2. As shown in (a) of FIG. 2, the buffle section 101 is constituted, for example, by a circular plate member, and as shown in FIG. 3, the buffle section 101 is installed to have the predetermined angle $\theta_c$ with an installation surface 51 such as the ground. Further, as shown in FIG. 3, the side of the first surface (i.e., the side of the front surface 101a) of the buffle section 101 is a sound source localization target region X, and the side of the second surface (i.e., the side of the back surface 101b) of the buffle section 101 is a sound source localization non-target region Y. It should be noted that the buffle section 10 may be constituted by a member, such as metal, lumber, or resin material, that does not allow passage of sound waves or that allows passage of sound waves but sufficiently attenuates them. Alternatively, the buffle section 101 may be constituted by a plate member made of an artificial material, such as a particle board, a chip board, a wood wool cement board, an apitong plywood board, formed by sticking uniform fibers together with an adhesive and applying a high pressure to the resulting product. Alternatively, the buffle section 101 may be constituted by a plate member that is as strong (high in rigidity) and heavy (high in specific gravity) as a buffle plate that supports a speaker unit.

(Installation Method)

The following describes, with examples, a method for installing the sound pickup device 10 such that the buffle section 101 forms the predetermined angle $\theta_c$ with the installation surface 51.

Figure 5B:
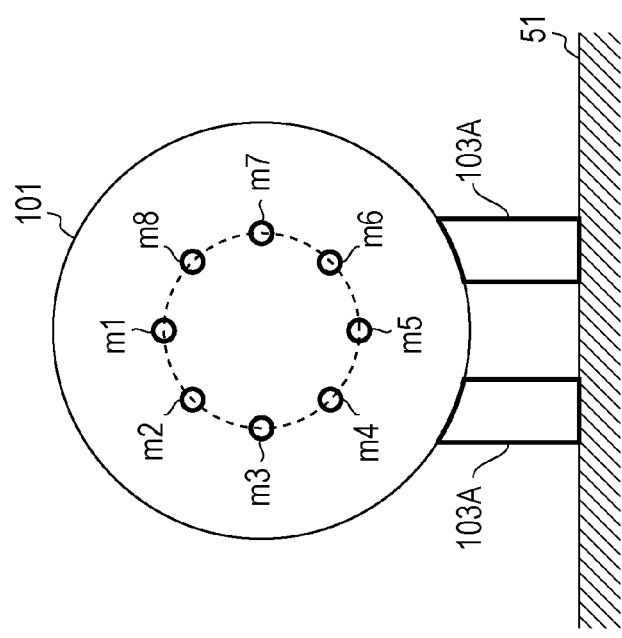
FIG. 5B is a side view of the sound pickup device shown in FIG. 5A.

FIG. 4A is a diagram showing an example of installation of the sound pickup device 10 according to the present embodiment. FIG. 4B is a side view of the sound pickup device 10 shown in FIG. 4A. FIG. 5A is a diagram showing another example of installation of the sound pickup device 10 according to the present embodiment. FIG. 5B is a side view of the sound pickup device 10 shown in FIG. 5A.

For example, as shown in FIGS. 4A and 4B, the sound pickup device 10 is installed such that a supporting member 103 that supports the buffle section 101 causes the buffle section 101 to form the predetermined angle $\theta_c$ with the installation surface 51. It should be noted that the method for installing the sound pickup device 10 such that the buffle section 101 forms the predetermined angle $\theta_c$ with the installation surface 51 is not limited to the case shown in FIGS. 4A and 4B where the supporting member 103, which supports the second surface (back surface) of the buffle section 101, is used. For example, as shown in FIGS. 5A and 5B, a supporting member 103A that supports a lower end of the buffle section 101 may be used. That is, any supporting member may be used, provided the sound pickup device 10 can be installed such that the buffle section 101 forms the predetermined angle $\theta_c$ with the installation surface 51.

(Method for Calculating Diameter $d_1$)

The following describes the method for calculating the diameter $d_1$ of the buffle section 101. First, with reference to FIGS. 6 and 7, a relationship between the diameter $d_1$ of the buffle section 101, the maximum length $d_0$ of intervals between the plurality of microphone elements, and the predetermined angle $\theta_c$ is described, and then, the method for calculating the diameter $d_1$ of the buffle section 101 is described.

FIG. 6 is a diagram for explaining a relationship between a sound source that maximizes the phase difference between sound waves arriving at the sound pickup device 10 shown in FIG. 3 and the arrangement of the plurality of microphone elements. More specifically, FIG. 6 schematically shows a sound source A that maximizes the phase difference $\tau_{A15}$ between sound waves arriving at the microphone elements m1 and m5, respectively, and the way in which the sound waves arrive at the respective microphone elements from the sound source A. In other words, in the sound source localization target region X, the phase difference $\tau_{A15}$ between the sound waves arriving at the microphone elements m1 and m5, respectively, from the sound source A, which is located in a direction parallel to the array plane (which is the first surface in the present embodiment) of the plurality of microphone elements (microphone elements m1 to m8), takes on the maximum value.

Therefore, the maximum value of the phase difference (difference in time of arrival) $\tau_{A15}$ between sound waves arriving at the microphone elements m1 and m5, respectively, from a sound source in the sound source localization target region X (front surface side) can be expressed as (Eq. 1):

$$\tau_{A15} = d_0/C \quad (\text{Eq. 1})$$

where C is the velocity of sound in air.

FIG. 7 is a diagram for explaining a relationship between a sound source that minimizes the phase difference between sound waves arriving at the sound pickup device 10 shown in FIG. 3 and the size of the buffle section 101. More specifically, FIG. 7 schematically shows a sound source B that minimizes the phase difference $\tau_{B15}$ between sound waves arriving at the microphone elements m1 and m5, respectively, and the way in which the sound waves arrive at the respective microphone elements from the sound source B. In other words, in the sound source localization non-target region Y, the phase difference $\tau_{B15}$ between the sound waves arriving at the microphone elements m1 and m5, respectively, from the sound source B, which is located in a direction passing through the array center of the plurality of microphone elements (microphone elements m1 to m8) and parallel to the installation surface 51, takes on the minimum value.

Therefore, the minimum value of the phase difference $\tau_{B15}$ between sound waves arriving at the microphone elements m1 and m5, respectively, from a sound source in the sound source localization non-target region Y (back surface side) can be expressed as (Eq. 2):

$$\tau_{B15} = d_1 * \cos(\theta_c)/C \quad (\text{Eq. 2})$$

Note here that satisfying the relationship of (Eq. 3) below makes it possible to distinguish between even sound sources that have symmetry with respect to the array plane of the microphone array 102 (plurality of microphone elements). This is because, in the sound source localization apparatus 1, which detects a sound source on the basis of phase information, the phase difference between sound waves coming from a sound source in the sound source localization non-target region Y (back surface side) is always larger than the phase difference between sound waves coming from a sound source in the sound source localization target region X (front surface side).

$$\tau_{A15} < \tau_{B15} \quad (\text{Eq. 3})$$

Therefore, the diameter $d_1$ of the buffle section 101 needs only be calculated to satisfy the relationship of (Eq. 4) obtained by substituting (Eq. 1) and (Eq. 2) in (Eq. 3) and solving the equation.

$$d_0/\cos(\theta_c) < d_1 \quad (\text{Eq. 4})$$

Note here that, for example, in a case where the predetermined angle $\theta_c$ is 60 degrees, $\cos(\theta_c)=0.5$; therefore, the diameter $d_1$ of the buffle section 101 is calculated to be more than twice as large as the maximum length $d_0$ of intervals between the plurality of microphone elements. It should be noted that although there can theoretically be a case where the predetermined angle $\theta_c$ is 0 degree or 90 degrees, the case where the predetermined angle $\theta_c$ is 0 degree or 90 degrees may be excluded for the reason noted below.

(Predetermined Angle $\theta_c$)

Figure 8:
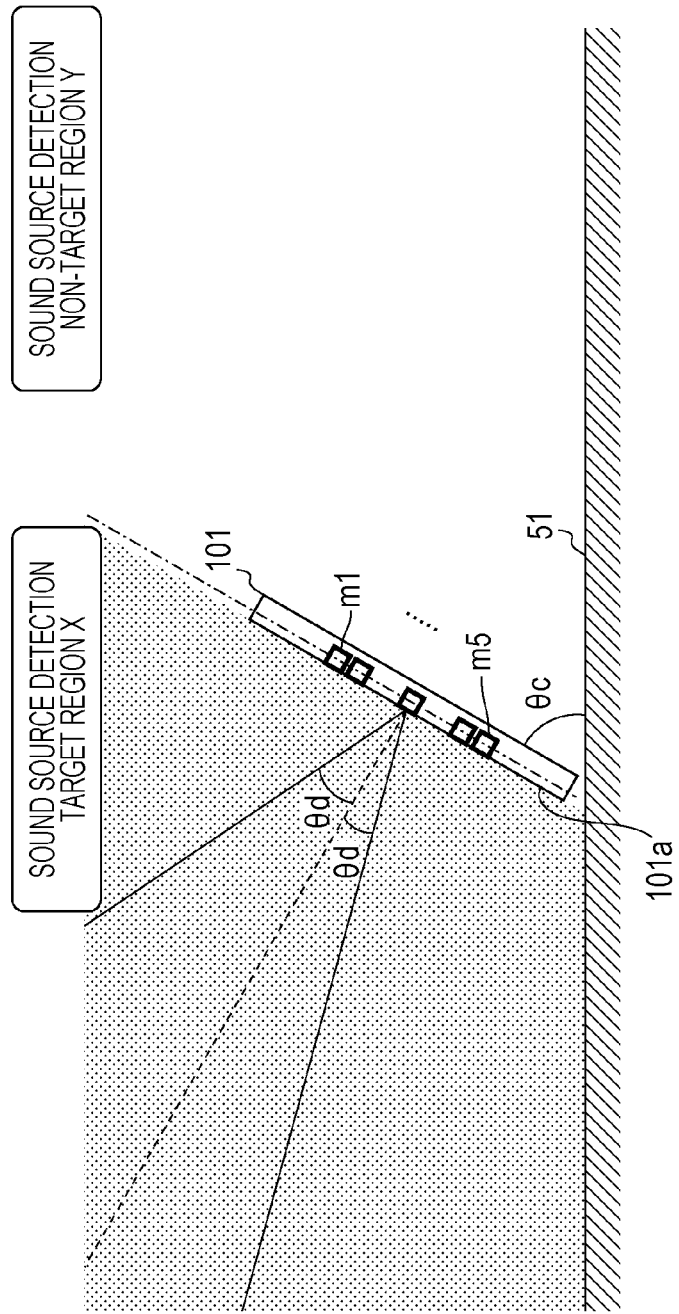
FIG. 8 is a diagram showing the angle of sound source of the sound pickup device shown in FIG. 3.
Figure 9:
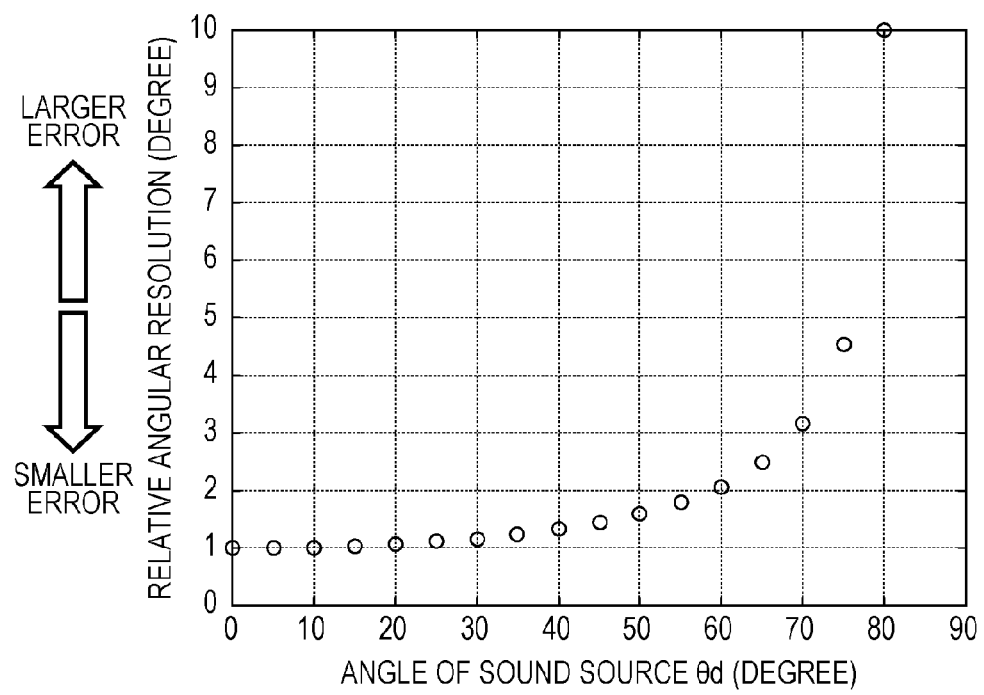
FIG. 9 is a diagram showing a relationship between the angle of sound source and relative angular resolution of the sound pickup device shown in FIG. 8.

A relationship between the relative angular resolution of the sound pickup device 10 and the predetermined angle $\theta_c$ is described with reference to FIGS. 8 and 9. FIG. 8 is a diagram showing the angle $\theta_d$ of sound source of the sound pickup device 10 shown in FIG. 3. FIG. 9 is a diagram showing a relationship between the angle of sound source and relative angular resolution of the sound pickup device 10 shown in FIG. 8. Note here that, as shown in FIG. 8, the angle $\theta_d$ of sound source is an angle based on a direction normal to the first surface (front surface 101*a*) of the sound pickup device 10, i.e., a direction normal to the array surface of the microphone array 102 (plurality of microphone elements). Meanwhile, assuming that the interval $\Delta d$ between two microphone elements constituting the microphone array 102 is 40 mm, the graph shown in FIG. 9 represents the relative angular resolution at different angles $\theta_d$ of sound source in a case where there is a performance in which the relative angular resolution is 1 degree at the perpendicular ($\theta=0$ degree). That is, the relative angular resolution represented by the vertical axis shown in FIG. 9 represents an error that occurs in a case where a distant target object has been detected at the angle $\theta_d$ of sound source. It should be noted that the calculation assumes that the phase difference between the microphone elements is constant.

The graph shown in FIG. 9 shows that the relative angular resolution is highest in the direction normal to the array surface of the microphone array 102 (i.e., at the angle $\theta_d$ of sound source of 0 degree in the graph), and that the performance extremely deteriorates at an angle $\theta_d$ of sound source of greater than 60 degrees, at which the error becomes more than twice as large.

That is, this shows that highly accurate sound source localization can be performed by facing the array surface of the microphone array 102 at an inclination of up to approximately 60 degrees with respect to the direction in which a sound source localization target object is located. Therefore, it is not necessary to set the predetermined angle $\theta_c$ at 0 degree, except, for example, for a case where a sound source localization target object is located in a direction perpendicular to (direction directly above) the installation surface 51.

Moreover, for the utilization of the sound pickup device 10 with high relative angular resolution, the predetermined angle $\theta_c$ may be varied depending on the location of a sound source localization target object. For example, suppose a case where it is necessary to, in the sound source localization target region X, detect (pick up) sound generated by a flying object hovering in a location at a distance of several hundred meters from the sound source localization apparatus 1 and at an altitude of 10 m from the installation surface 51 (ground). In this case, the flying object is at an angle of approximately 10 to 20 degrees from the installation surface 51 with respect to the point at which the sound source localization apparatus 1 has been installed. Therefore, in order to perform highly accurate sound source localization at this angle, it is only necessary to set the predetermined angle $\theta_c$ at approximately 45 to 60 degrees. That is, in order to highly accurately detect sound from a sound source localization target located at a distance from the sound source localization apparatus 1, it is only necessary to set the predetermined angle $\theta_c$ at approximately 30 degrees by facing the direction normal to the array surface of the microphone array 102 in the direction in which the object is located.

[Signal Processor 11]

The signal processor 11 can discriminate a sound source or identify the location of a sound source by processing signals (in FIG. 1, eight signals) outputted from the plurality of microphone elements. More specifically, the signal processor 11 performs A/D (analog-to-digital) conversion on the signals outputted from the plurality of microphone elements, performs a computation process based on the phase differences between the plurality of microphone elements after having performed a process of conversion into temporal signals or frequency domain signals, and thereby localizes or discriminates the direction from which sound comes. The signal processor 11 may be an arithmetic unit, such as a PC, physically connected to the plurality of microphone elements of the sound pickup device 10, or may be a central processing unit (CPU) that constitutes the sound source localization apparatus 1.

In the present embodiment, the signal processor 11 can eliminate the influence of sound from a sound source at the back surface side (region Y) of the sound pickup device 10, and as such, it can discriminate even a sound source, located at the front surface side (region X) at a distance from the sound pickup device 10, from which only small sound arrives at the sound pickup device 10, and identify the location of the sound source. The signal processor 11 causes the display section 12 to display the processing result.

It should be noted that the signal processor 11 may alternatively generate, as a processing result, a sound source image signal representing the location of a sound source identified and cause the display section 12 to display the processing result.

Further, in the present embodiment, sound source localization is performed on the basis of the phase differences between sound waves respectively inputted to the plurality of microphone elements arrayed. Note here that commonly-known examples of techniques for sound source localization include the beamforming technique (BF technique), the sound intensity technique (SI technique), the envelope intensity technique (EI technique), and the like. In the SI technique and the EI technique, the direction from which sound comes can be directly detected. In the BF technique, an intensity distribution of a sound pressure is utilized, and the direction of a point at which the sound pressure reaches a maximum can be found to be a sound source. These techniques for sound source localization are widely known and stray from the main subject of the present disclosure, and as such, they are not described in detail here.

[Display Section 12]

The display section 12 displays a processing result yielded by the signal processor 11. For example, the display section 12 is for example a display and displays, as a processing result yielded by the signal processor 11, a region X and the location of a sound source in the region X.

[Effects and the Like]

As described above, the present embodiment makes it possible to suppress the influence of sound waves coming from the second surface (back surface side), thus allowing the sound source localization apparatus 1 to more surely detect a sound source at the first surface (front surface side), i.e., a sound source located in the detection target region.

Further, in the sound source localization apparatus 1 according to the present embodiment, the plurality of microphone elements are arrayed in the part of the baffle section 101 that is closer to the center of the baffle section 101 than the outer edge of the baffle section 101 by the predetermined or greater length, and the first surface of the baffle section 101 forms the predetermined angle $\theta_c$ with the installation surface 51. This allows the sound source localization apparatus 1 to distinguish between even sound sources that have symmetry with respect to the array plane of the microphone array 102 (plurality of microphone elements). This is because, in the sound source localization apparatus 1, which detects a sound source on the basis of phase information, the phase difference between sound waves coming from a sound source in the sound source localization non-target region Y (back surface side) is always larger than the phase difference between sound waves coming from a sound source in the sound source localization target region X (front surface side).

Figure 10:
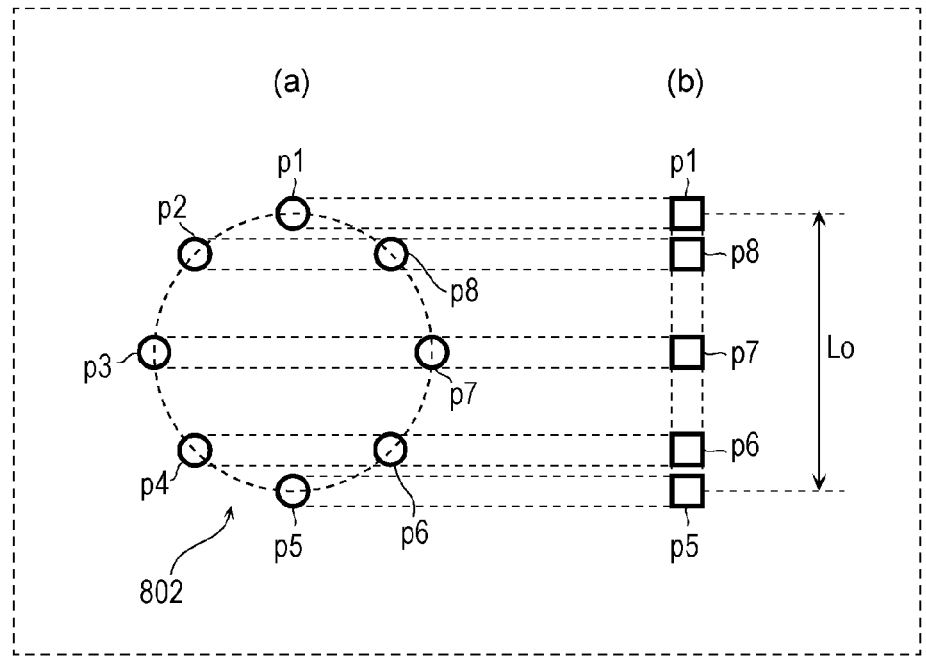
FIG. 10 is a diagram showing a circular microphone array according to a comparative example.
Figure 11:
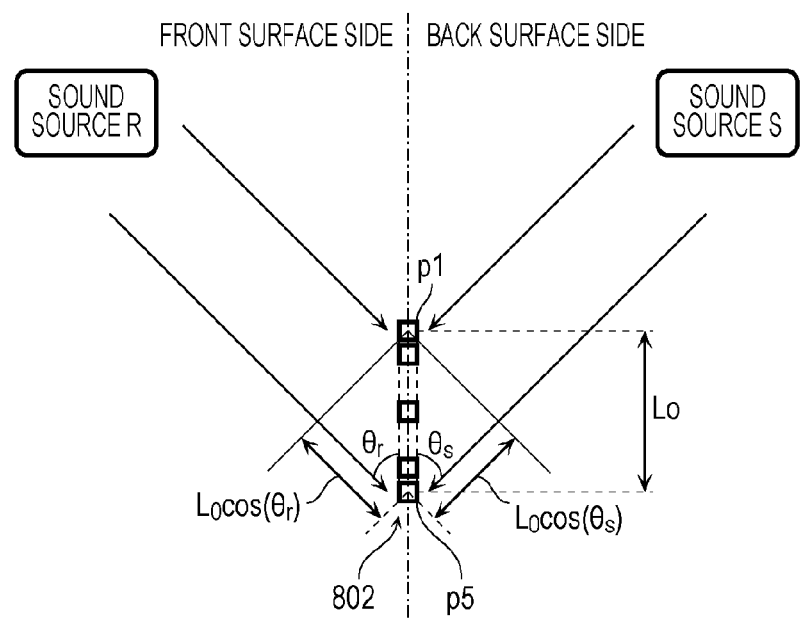
FIG. 11 is a diagram for explaining the phase differences between sound waves coming from sound sources in plane symmetry directions with respect to the circular microphone array according to the comparative example shown in FIG. 10.

On the other hand, a conventional sound source localization apparatus serving as a comparative example cannot distinguish between sound sources (a sound source at the front surface side and a sound source at the back surface side) that have symmetry with respect to the array plane of the microphone array, as the phase difference between sound waves from one of the sound sources is equal to the phase difference between sound waves from the other sound source. This is more specifically described with reference to FIGS. 10 and 11. FIG. 10 is a diagram showing an circular microphone array 802 according to the comparative example. FIG. 11 is a diagram for explaining the phase differences between sound waves coming from sound sources in plane symmetry directions with respect to the circular microphone array 802 according to the comparative example shown in FIG. 10. As shown in FIG. 10, the circular microphone array 802 according to the comparative example includes eight microphone elements (microphone elements p1 to p8), and the maximum length of intervals between the microphone elements is $L_0$. In this case, the phase difference (difference in time of arrival) between sound waves arriving at the microphone elements p1 and p5, respectively, from a sound source R at the front surface side can be expressed as $\tau_{R15}=L_0*\cos(\theta_r)/C$, and the phase difference (difference in time of arrival) between sound waves arriving at the microphone elements p1 and p5, respectively, from a sound source S at the back surface side can be expressed as $\tau_{S15}=L_0*\cos(\theta_s)/C$. Moreover, since the sound source R at the front surface side and the sound source S at the back surface side are sound sources that have symmetry with respect to a plane, $\theta r=\theta s$. That is, since the phase differences are equal ($\tau_{R15}=\tau_{S15}$), the circular microphone array 802 according to the comparative example cannot distinguish between the sound source R and the sound source S.

Furthermore, since the phase difference between sound waves coming from a sound source in the sound source localization non-target region Y (back surface side) is always larger than the phase difference between sound waves coming from a sound source in the sound source localization target region X (front surface side), the sound source localization apparatus 1 according to the present embodiment can eliminate the influence of the sound source in the region Y (back surface side). This allows the sound source localization apparatus 1 according to the present embodiment to more surely detect even a sound source, located in the detection target region, from which only small sound comes. That is, the region Y (back surface side) can be excluded from the range of sound source localization, and a sound source from which only small sound comes can be more surely detected even in a high-noise environment, provided it is a sound source in the sound source localization target region X (front surface side).

Modification 1

Figure 12:
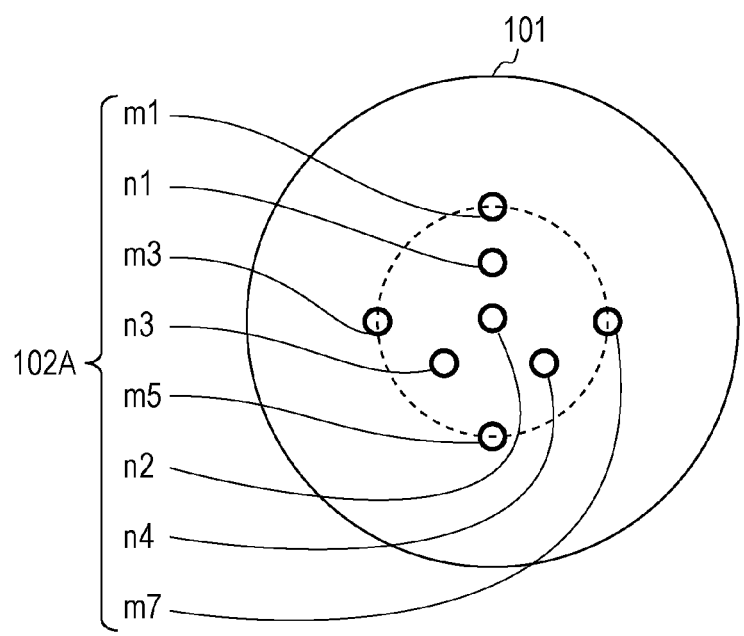
FIG. 12 is a diagram showing an example of arrangement of a microphone array of a sound pickup device according to Modification 1.

FIG. 12 is a diagram showing an example of arrangement of a microphone array 102A of a sound pickup device 10A according to Modification 1. Constituent elements that are identical to those shown in FIG. 2 are given the same reference numerals, and as such, they are not described in detail.

In the embodiment described above, the plurality of microphone elements constituting the microphone array 102 have been described as being arrayed in an annular shape. However, this does not imply any limitation. For example, the plurality of microphone elements may be arrayed in a pentagonal shape or an octagonal shape. This is because the interval between two microphone elements determines a measurable frequency (upper-limit frequency). Further, for example, the plurality of microphone elements constituting the microphone array 102A may be arrayed as shown in FIG. 12.

In the example shown in FIG. 12, the plurality of microphone elements constituting the microphone array 102A consist of microphone elements m1, m3, m5, and m7 arrayed in an annular shape and microphone elements n1, n2, n3, and n4 arrayed inside of the annular ring. In this manner, some of the plurality of microphone elements constituting the microphone array 102A may be intentionally placed at varying distances from the outer edge of the buffle section 101. Doing so effects a difference between the appearance of the phase difference between sound waves coming from a sound source in the sound source localization target region X (front surface side) and the appearance of the phase difference between sound waves coming from a sound source in the sound source localization non-target region Y (back surface side). This makes it possible to more surely detect a sound source at the first surface (front surface side), i.e., a sound source located in the detection target region.

Modification 2

Figure 13:
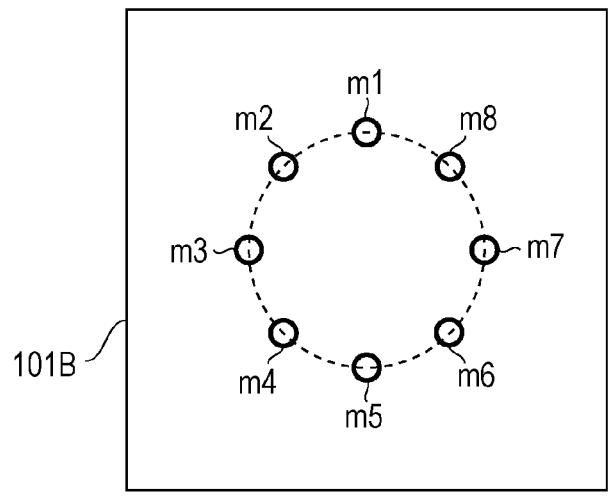
FIG. 13 is a diagram showing an example of a buffle section of a sound pickup device according to Modification 2.

FIG. 13 is a diagram showing an example of a buffle section 101B of a sound pickup device 10B according to Modification 2.

In the embodiment describes above, the buffle section 101 has been described as a circular plate member. However, the buffle section 101 does not necessarily need to be circular. For example, as shown in FIG. 13, the buffle section 101 may alternatively be a rectangular plate member.

In this case, the length of a side of the buffle section 101B can be calculated on the basis of the maximum length of intervals between the plurality of microphone elements and a predetermined angle.

More specifically, the diameter $d_1$ of the buffle section 101 needs only be taken as the length $d_1$ of a side of the buffle section 101B, and the length $d_1$ of a side of the buffle section 101B needs only be calculated to satisfy the relationship of (Eq. 4). That is, the length $d_1$ of a side of the buffle section 101B needs only be calculated to satisfy the relationship $(d_0/\COS(\theta_c))<d_1$, where $d_1$ is the length of a side of the buffle section 101B, $d_0$ is the maximum length of intervals between the plurality of microphone elements, and $\theta_c$ is the predetermined angle.

Modification 3

Figure 14:
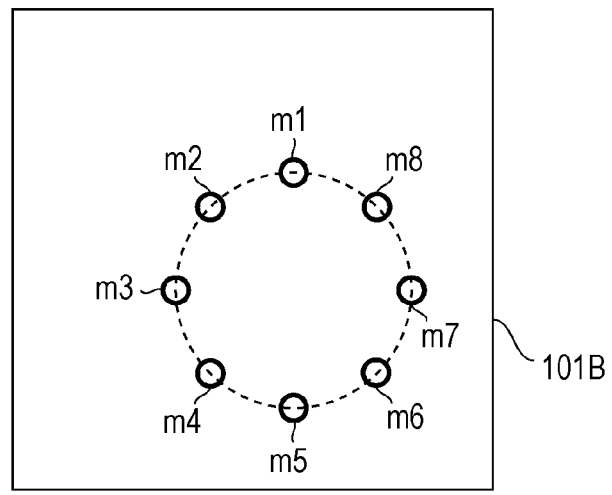
FIG. 14 is a diagram showing an example of arrangement of a microphone array of a sound pickup device according to Modification 3.

FIG. 14 is a diagram showing an example of arrangement of a microphone array 102 of a sound pickup device 100 according to Modification 3.

In the embodiment described above (e.g., FIG. 2, etc.) and Modification 2 (e.g., FIG. 13, etc.), the descriptions are based on the premise that the center position of the buffle section coincides with the center position of the microphone array (microphone elements m1 to m8). However, this does not imply any limitation. As shown in FIG. 14, the center position of the buffle section 101B does not need to coincide with the center position of the microphone array 102 (microphone elements m1 to m8).

Modification 4

In the embodiment described above, the sound pickup device 10 has been described as being directly installed on the installation surface 51. However, this does not imply any limitation. The sound pickup device 10 may be installed such that the center position of the buffer section 101 is higher than the installation surface 51 by approximately 1 m.

The sound source localization apparatus and the like according to one or more aspects of the present disclosure have been described above on the basis the embodiment and the modifications. However, the present disclosure is not limited to such embodiments as these. Various modifications to the present embodiment that a person skilled in the art can conceive of and forms that are built by combining constituent elements in different embodiments may be encompassed in the scope of one or more aspects of the present disclosure, provided such modifications and forms do not depart from the spirit of the present disclosure. For example, cases such as those described below are encompassed in the present disclosure.

(1) For example, the sound source localization apparatus may further include an imaging and photographing unit such as a camera. In this case, the sound source localization apparatus may have its camera disposed in the center of the microphone array of the sound pickup device, or may have its camera provided in a different position from the sound pickup device.

More specifically, a photographed image obtained by the camera may be inputted to the signal processor 11, and the signal processor 11 may produce an image by superimposing, onto the photographed image thus inputted, a sound source image representing the location of a sound source identified, and cause the display section 12 to display the image as a processing result.

(2) The signal processor may be a computer system including a microprocessor, a ROM, a RAM, a hard disk unit, a display section, a keyboard, a mouse, and the like. A computer program is stored in the RAM or the hard disk unit. By operating in accordance with the computer program, the microprocessor enables each device to achieve its function. Note here that the computer program is constituted by a combination of plurality of command codes indicating instructions to a computer to achieve a predetermined function.

(3) Some or all of the constituent elements constituting the signal processor may be constituted by one system LSI (large-scale integration). The system LSI is a super multi-function LSI fabricated by integrating a plurality of constituent sections onto one chip. Specifically, the system LSI is a computer system including a microprocessor, a ROM, a RAM, and the like. A computer program is stored in the RAM. By operating in accordance with the computer program, the microprocessor enables the system LSI to achieve its functions.

(4) Some or all of the constituent elements constituting the signal processor may be constituted by an IC card or a monolithic module that is attachable to and detachable from each device. The IC card or the module is a computer system including a microprocessor, a ROM, a RAM, and the like. The IC card or the module may be the super multi-function LSI described above. By operating in accordance with the computer program, the microprocessor enables the IC card or the module to achieve its functions. The IC card or the module may have tamper resistance.

The present disclosure is applicable to sound source localization apparatuses each including a plurality of microphone elements and, in particular, to a sound source localization apparatus that is capable of detecting a sound source, located in a detection target region, from which only small sound comes, such as a radio-controlled helicopter, a drone, a helicopter, an airplane located in a comparatively distant place from the sound source localization apparatus.

What is claimed is:

1. A sound source localization apparatus comprising:
a plurality of microphones;
a baffle having a first surface and a second surface, the second surface being a surface opposite to the first surface, the plurality of microphones being two-dimensionally arrayed and fixed in the first surface,
wherein the baffle allows the plurality of microphones to pick up direct sound from a first sound source located at a side of the first surface and prevents the plurality of microphones from picking up direct sound from a second sound source located at a side of the second surface, wherein a second phase difference of a second sound wave arriving at the plurality of microphones at the side of the first surface from the second surface is larger than a first phase difference of a first sound wave arriving at the plurality of microphones at the side of the first surface from the first sound source,
wherein the second sound wave is diffracted by the second surface to arrive at the plurality of microphones at the side of the first surface.

2. The sound source localization apparatus according to claim 1, wherein the plurality of microphones are arrayed in a part of the baffle that is closer to a center of the baffle than an outer edge of the baffle by a predetermined or greater length.

3. The sound source localization apparatus according to claim 1, further comprising a support that supports the baffle such that the first surface of the baffle forms a predetermined angle with an installation surface upon which the sound source localization apparatus is provided.

4. The sound source localization apparatus according to claim 3, wherein the baffle is a circular plate, and
a diameter of the baffle is calculated on a basis of a maximum length of intervals between the plurality of microphones and the predetermined angle.

5. The sound source localization apparatus according to claim 4, wherein a relationship $(d_0/\cos(\theta_c)) < d_1$ is satisfied, where $d_1$ is the diameter of the baffle, $d_0$ is the maximum length, and $\theta_c$ is the predetermined angle.

6. The sound source localization apparatus according to claim 3, wherein the baffle is a rectangular plate, and
a length of a side of the baffle is calculated on a basis of a maximum length of intervals between the plurality of microphones and the predetermined angle.

7. The sound source localization apparatus according to claim 6, wherein a relationship $(d_0/\cos(\theta_c)) < d_1$ is satisfied, where $d_1$ is the length of a side of the baffle, $d_0$ is the maximum length, and $\theta_c$ is the predetermined angle.

8. The sound source localization apparatus according to claim 1, wherein the plurality of microphones are buried in the baffle such that sound holes of the plurality of microphones are exposed at the first surface but are not exposed at the second surface.

* * * * *